US011990049B2

(12) United States Patent
Prosser et al.

(10) Patent No.: US 11,990,049 B2
(45) Date of Patent: May 21, 2024

(54) PIECEWISE RECOVERY SYSTEM

(71) Applicant: Gulfstream Aerospace Corporation, Savannah, GA (US)

(72) Inventors: Kevin Prosser, Savannah, GA (US); Thomas Landers, Savannah, GA (US); Abhishek Vaidya, Savannah, GA (US); Blake Finlayson, Savannah, GA (US); Alborz Sakhaei, Savannah, GA (US)

(73) Assignee: GULFSTREAM AEROSPACE CORPORATION, Savannah, GA (US)

( * ) Notice: Subject to any disclaimer, the term of this patent is extended or adjusted under 35 U.S.C. 154(b) by 626 days.

(21) Appl. No.: 16/552,620

(22) Filed: Aug. 27, 2019

(65) Prior Publication Data

US 2020/0066166 A1 Feb. 27, 2020

Related U.S. Application Data

(60) Provisional application No. 62/723,194, filed on Aug. 27, 2018.

(51) Int. Cl.
*G08G 5/00* (2006.01)
*B64D 45/00* (2006.01)
*G05D 1/00* (2006.01)

(52) U.S. Cl.
CPC ........... *G08G 5/0039* (2013.01); *B64D 45/00* (2013.01); *G05D 1/0061* (2013.01);
(Continued)

(58) Field of Classification Search
None
See application file for complete search history.

(56) References Cited

U.S. PATENT DOCUMENTS

2006/0097895 A1  5/2006  Reynolds et al.
2009/0132103 A1*  5/2009  Marty ............... G01C 21/00
                                                         701/3
(Continued)

FOREIGN PATENT DOCUMENTS

CN     104364154 A    2/2015
CN     106530840 A    3/2017
(Continued)

OTHER PUBLICATIONS

Burcham, Jr. et al., Manual Manipulation of Engine Throttles for Emergency Flight Control [online], Jan. 2004 [retrieved on Mar. 6, 2021]. Retrieved from the internet: <https://ntrs.nasa.gov/api/citations/20040021348/downloads/20040021348.pdf>. (Year: 2004).*

*Primary Examiner* — Christian Chace
*Assistant Examiner* — Katherine Marie Fitzharris
(74) *Attorney, Agent, or Firm* — LKGLOBAL | Lorenz & Kopf, LLP

(57) ABSTRACT

A projected recovery trajectory for an aircraft autopilot system is precomputed by providing a stored set of predefined recovery mode segments, including: a mode 1 segment that models the aircraft coasting; a mode 2 segment that models the aircraft executing a nose high recovery; a mode 3 segment that models the aircraft executing a nose low recovery; a mode 4 segment that models the aircraft executing a throttle only recovery; and a mode 5 segment that models the aircraft executing a terrain avoidance recovery. A processor generates at least one projected recovery trajectory based on a current state of the aircraft, where the processor selectively concatenates selected ones of the predefined recovery mode segments into a sequence and uses that sequence to generate the projected trajectory.

20 Claims, 5 Drawing Sheets

(52) U.S. Cl.
CPC ........... *G08G 5/0056* (2013.01); *G08G 5/006* (2013.01); *B64D 2045/0085* (2013.01)

(56) References Cited

U.S. PATENT DOCUMENTS

| | | | |
|---|---|---|---|
| 2010/0042273 A1* | 2/2010 | Meunier | G05D 1/0676 |
| | | | 701/9 |
| 2010/0076626 A1 | 3/2010 | Botargues et al. | |
| 2010/0100261 A1 | 4/2010 | Botargues et al. | |
| 2016/0225269 A1* | 8/2016 | Nikolajevic | G08G 5/045 |

FOREIGN PATENT DOCUMENTS

| | | |
|---|---|---|
| CN | 106662870 A | 5/2017 |
| FR | 2905756 A1 | 3/2008 |

* cited by examiner

PIECEWISE RECOVERY SYSTEM

CROSS-REFERENCE TO RELATED APPLICATION

This application takes priority under 35 U.S.C. § 229 (e) to U.S. provisional application Ser. No. 62/723,194, filed Aug. 27, 2018, entitled Aircraft Flight Envelope Protection Framework; the entire disclosure, drawings and appendices of which are incorporated herein by reference.

TECHNICAL FIELD

The present disclosure generally relates to aircraft flight envelope protection systems, and more particularly to aircraft flight envelope protection systems that models potential aircraft trajectories using a trajectory recipe that constructs a piecewise recovery strategy that can efficiently handle a range of different recovery scenarios.

BACKGROUND

This section provides background information related to the present disclosure which is not necessarily prior art.

Aircraft are designed to operate within certain operating speeds and loads on control surfaces of the aircraft. These operating limits are known as the flight envelope, outside of which there may be damage or loss of control of the aircraft. Additionally, aircraft must operate over flight trajectories that avoid collision with material objects such as ground terrain and other aircraft. In order to protect against operating outside of the flight envelope or colliding with other objects, conventional aircraft utilize many disparate protection or safety systems that each evaluate individual aspects of the aircraft to determine whether the aircraft is operating outside of the flight envelope or is likely to collide with the ground or other objects on the present flight path.

Such flight envelope violations and collision violations can be all be considered threats, for which the pilot or an autopilot system needs to be able to avoid. This is typically done by initiating a recovery trajectory that moves the aircraft closer to the center or sweet spot of its operating envelope and away from terrain hazards. In real-world flying conditions there are many, many variations on the types and severities of threats that a pilot or autopilot system must be prepared to deal with. Thus it is practically impossible to compute all possible options.

SUMMARY

The disclosed system precomputes projected recovery trajectories using a highly efficient technique that is able to model a wide range of different recovery scenarios in a modular or piecewise fashion. Taking this piecewise approach, the system solves the immediate problem first and then moves on to the next immediate problem. For example, in a nose high inverted case, the piecewise approach the processor solves the inverted problem first, and then resolves the ensuing nose low problem. In this way a piecewise solution is generated that will confidently address the available recovery options.

Accordingly, in the disclosed system, a projected recovery trajectory for an aircraft autopilot system is precomputed by providing a stored set of predefined recovery mode segments, including: a mode 1 segment that models the aircraft coasting; a mode 2 segment that models the aircraft executing a nose high recovery; a mode 3 segment that models the aircraft executing a nose low recovery; a mode 4 segment that models the aircraft executing a throttle only recovery; and a mode 5 segment that models the aircraft executing a terrain avoidance recovery. A processor generates at least one projected recovery trajectory based on a current state of the aircraft, where the processor selectively concatenates selected ones of the predefined recovery mode segments into a sequence and uses that sequence to generate the projected trajectory.

BRIEF DESCRIPTION OF THE DRAWINGS

The drawings described herein are for illustrative purposes only of selected embodiments and not all possible implementations. Thus the particular choice of drawings is not intended to limit the scope of the present disclosure.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Introduction

The disclosed aircraft flight envelope protection system uses flight path predictive techniques to provide unified, full-envelope protection, working across the entire spectrum of aircraft flight conditions to address a full spectrum of different types of hazards. Flight path predictions are computed continuously from the aircraft's current situation using a kinematic energy model. Plural predicted trajectories are calculated, each representing a different escape route that will recover from a hazard when the threshold or trigger point for that hazard is reached. The system respects different types of hazards, some dealing with innate aircraft properties, such as speed and altitude limits, and some dealing with external concerns, such as terrain and object avoidance. The disclosed aircraft flight envelope protection system is designed to work across all such threat envelope boundaries.

Although plural trajectories are calculated, the envelope protection system continually assesses, and deprecates trajectories that are not feasible in the aircraft's current situation. A deprecated trajectory is treated by the system as not viable, unless the aircraft's situation changes such that the deprecated trajectory again becomes viable. The disclosed protection system works in the background, and does not override or usurp the pilot's authority until only one viable predicted trajectory remains (all other predicted trajectories have been deprecated), and a threat is triggered. In this event, the protection system automatically deploys an autopilot mechanism to take evasive action to recover from the hazard condition. The protection system may also generate warnings to the pilot, but is preferably not dependent on the pilot to take recovery action once the one remaining viable trajectory reaches the trigger point.

Preferably, the predictive envelope protection system is configured to provide a non-binary spectrum of recovery actions, including a passenger-safe, soft-ride recovery at one end of the spectrum and a hard recovery at the other end of the spectrum. When required to avert imminent threat, the system triggers a hard recovery. However in less extreme situations, where there is more time to recover, the system triggers a soft recovery—a passenger safe, smooth recovery. When such soft recovery is triggered the system will optionally blend input from the pilot into the recovery algorithm, allowing the pilot to modify the recovery aggressiveness based on the pilot's skill and experience.

Figure 1:
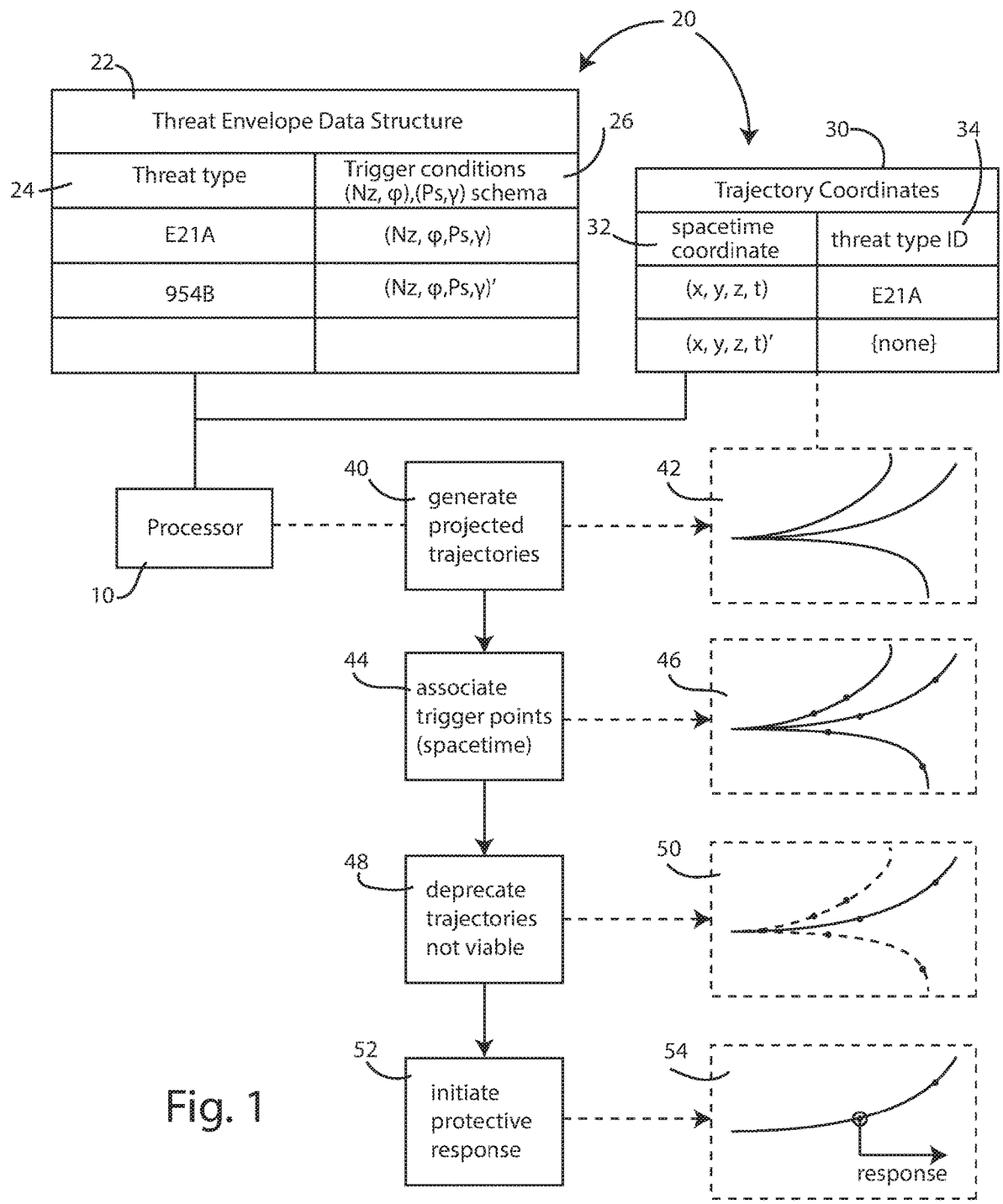
FIG. 1 is a block diagram illustrating the threat envelope and trajectory coordinates data structures, in conjunction with a processor programmed to performs steps to carry out the envelope protection function.

Referring to FIG. 1 an embodiment of the disclosed aircraft threat envelope protection system may be implemented using a processor 10 having an associated memory circuit 20 that is configured according to a predetermined threat envelope data structure 22 that stores a plurality of different types of threats associated with the aircraft 28. Preferably, the processor 10 and associated memory circuit 20 are carried by the aircraft. The data structure may comprise a table, list or matrix of records, each corresponding to a different threat type, shown in columnar form at 24 in FIG. 1. Each threat type 24 has a corresponding trigger condition stored at 26. These trigger conditions are parameterized using a common schema based on an n-dimensional threat space, and tell the processor 10 under what conditions the particular threat condition has been reached. Importantly, the common schema dimensions of the threat space are chosen so that a full spectrum of different threat conditions can be represented using a common, minimal set of fundamental variables. A presently preferred minimal set of fundamental variables is discussed below in the section entitled Kinematic-Energy Model.

The memory circuit 20 is also configured to support a trajectory coordinates data structure 30 that stores plural trajectories in terms of the spacetime coordinate variables 32. For illustration purposes, the spacetime coordinate variables have been identified using a rectangular coordinate system (x, y, z, t). Other coordinate systems (e.g., spherical) may also be used.

Generating Projected Trajectories

The trajectory coordinates data structure is populated with a sequence of spacetime coordinate variables (separately for each projected trajectory being modeled) that lie on and thus define the recovery trajectory shape in spacetime. To illustrate, the processor 10 is programmed to perform the generate the projected trajectories step, at 40, which results in a plurality of projected recovery trajectories being defined in terms of the spacetime coordinates, as illustrated in the spacetime illustration at 42. Each projected trajectory is computed, taking the current state of the aircraft as the starting point and assuming that each recovery maneuver is initiated at that moment.

In the example illustrated here, three projected trajectories are generated by processor 10. For the remainder of this disclosure three projected trajectories will be illustrated. In a given implementation, different numbers of trajectories may be used to define the working set of plural trajectories. In a commercial or business jet aircraft, three projected trajectories will normally be suitable to support smooth, passenger safe recoveries from threats. For aircraft, such as military aircraft, that may be required to fly inverted or in close proximity to the nape of the earth, a larger number of projected trajectories may desirable.

There are different ways for the processor to determine the spacetime shapes of each of the plural trajectories. In one embodiment the trajectory spacetime shapes follow a standardized set of predefined solution curves, corresponding to a set of known hazard avoidance maneuvers that are appropriate for the class of aircraft for which the protection system is designed. Typically these solution curves are based on what a trained pilot would likely fly to recover from the particular hazard. These might include, for example, a standard set of pull-up, dive, turn left and turn right maneuvers, where the specific parameters (e.g., climb and bank angles) are chosen to maximize passenger safety and comfort. In some implementations compound recovery maneuvers may be used, where different classes of maneuvers are concatenated together. For example, a business jet might employ a compound maneuver where a final climb maneuver is preceded by a zoom maneuver to exchange excess airspeed for altitude while capturing the optimum steady state climb. In this embodiment a standardized set of a relatively small number of predefined solution curves (e.g., three projected trajectories) is sufficient for many types of aircraft, including business jets. Working with a relatively small number of solution curves and a small number of fundamental kinematic-energy variables, places a minimal load on the processor. Because the trajectories are continually being recomputed, the system produces good results, even though the solution set has been reduced to only a few projected trajectories, based on a few fundamental variables. Of course, if higher resolution is required for a particular aircraft application, the processor can be programmed to compute a greater number of trajectories, and the calculations can be expanded to support additional variables. Parallel processing techniques and programmable gate array circuit components may be utilized to enhance or replace processor 10 if greater throughput is required.

As an alternative to generating projected trajectories from a small, standardized set of predefined solution curves, the processor can be programmed to select from a stored collection of different families of predefined solution curve sets, each family being designed for optimal recovery from a particular type or class of threat. Thus the solution curve family chosen for recovery from a stall hazard might be different from the solution curve family chosen for recovery from a service ceiling hazard. To assess which family of solutions to employ, the processor can project the current aircraft state onto the n-dimensional threat space to determine which threat family is most proximate to the current aircraft state. In so doing, the processor determines in real time which threat is most pressing and then bases the projected trajectory models on the family of predefined solution curves that is best suited under current circumstances.

Associating Threat Trigger Points to Each Potential Trajectory

Either in parallel as the trajectories are being generated, or serially after the trajectories have been generated, the processor, at step 44, associates applicable trigger points, corresponding to threats identified within the threat envelope data structure, to points in spacetime along each of the projected trajectories. For any given trajectory, initially there may be no detected threats. However, as the aircraft continues to fly and the trajectories are continually recomputed, at some point in time a threat may be detected and this threat (first detected in time) will be associated as a trigger point on each of the trajectories where applicable. As diagrammatically represented in the spacetime illustration at 46, these trigger points represent points along the spacetime trajectory when the aircraft will reach the threat response margin for which evasive or recovery action should be initiated.

It is worth emphasizing again that the generated projected trajectories represent different hypothetical trajectories that the pilot (or an automated system) might elect to follow. Because each of these trajectories is being continually generated, they all represent possible future states of the aircraft. The current state of the aircraft lies at the starting point or singularity from which the projected future trajectories diverge. So long as there are plural projected trajectories available, the pilot remains free to follow whatever course he or she desires. Whatever course the pilot elects to fly, the processor 10 merely re-computes its solutions for the predetermined future trajectories.

Deprecating Projected Trajectories that are Not Viable

As the aircraft continues to fly, and as the projected trajectories are continually recomputed, there may be instances where a given trajectory becomes no longer viable. This can happen, for example, when the aircraft lacks sufficient energy to perform the projected trajectory maneuver, or when the projected trajectory maneuver will result violate a speed limit which could potentially damage the aircraft. This can also happen if the projected trajectory places the aircraft on a collision course with a material object with a momentum sufficient to damage the aircraft. The processor 10, at step 48, evaluates each of the projected trajectories on this basis, and decommissions or deprecates any trajectory that is no longer viable. In FIG. 1 at 50, two of the projected trajectories are shown in dotted lines to indicate that they have been deprecated.

Trajectories that have been deprecated are not used in a subsequent protective response. However, because the trajectory solutions are continually being updated by the processor, a deprecated trajectory could return to viability if the condition that caused it to be deprecated is lifted. For example if a trajectory was deprecated because it put the aircraft on collision course with another aircraft, and the other aircraft has since moved out of collision range, the processor will reinstate that trajectory as viable by removing its deprecation state.

Initiating a Protective Response

As illustrated at 52, if the processor reaches a state where only one viable trajectory remains (all others have been deprecated), the processor initiates a protective response. This response can include sending a warning or alert message to the pilot, which the pilot may heed or not. Whether heeded or not, the protective response initiated by the processor is designed to set the aircraft on a computed trajectory that will avoid or escape from the first-encountered threat (if plural threats lie on the computed trajectory). To accomplish this the processor sends one or more commands to an autopilot system, the details of which will be discussed below.

Figure 5:
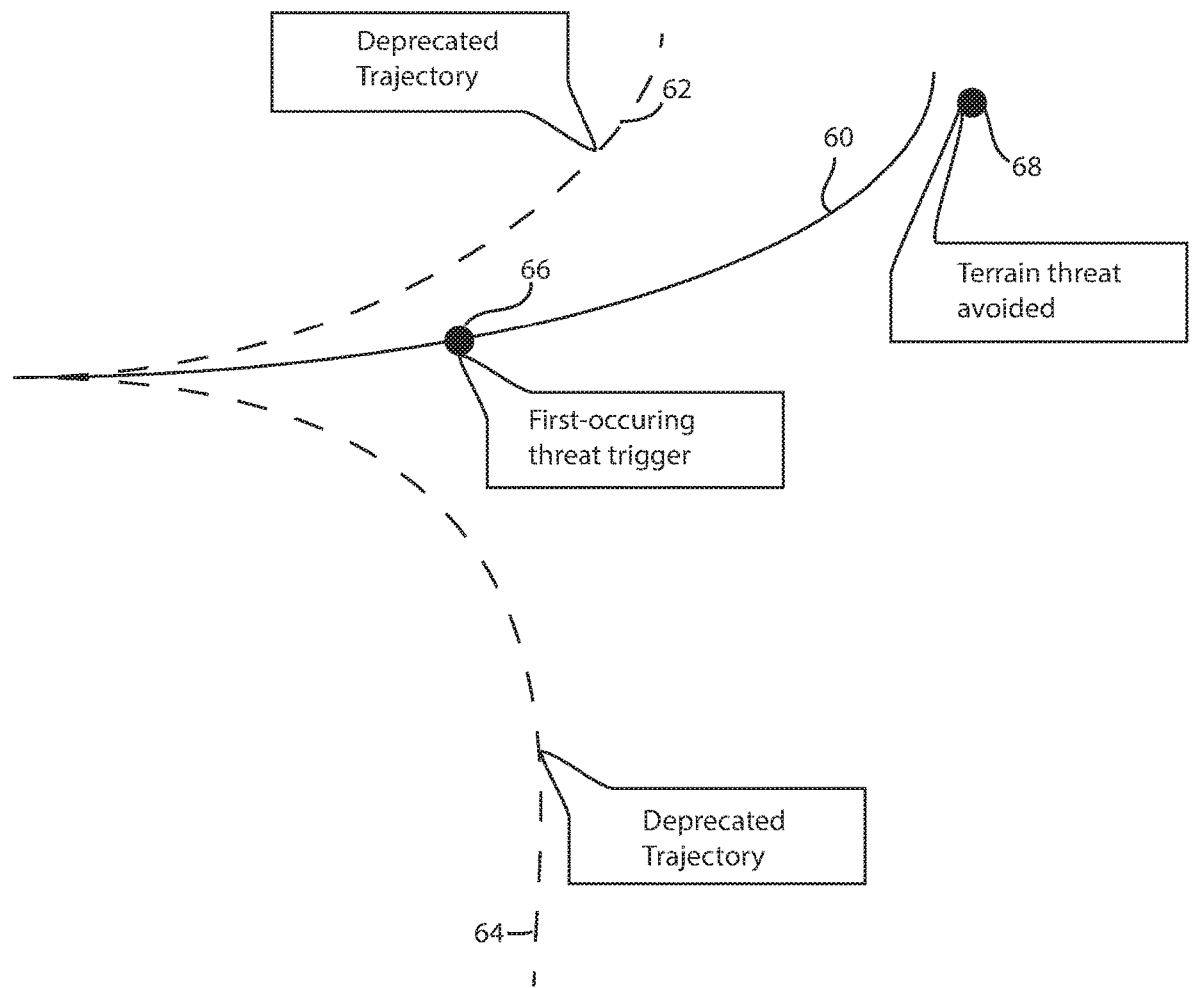
FIG. 5 is a detailed view of one viable and two deprecated trajectories, illustrating how the first-encountered trigger is used to initiate an aircraft protective response.

FIG. 5 illustrates this important hazard recovery response protocol in greater detail. As shown, one trajectory 60 remains viable, while trajectories 62 and 64 have been deprecated. Along the viable trajectory 60, the first-occurring threat 66 triggers the protective response to be initiated. When initiated, the aircraft flies according to the projected trajectory. In effect the projected trajectory becomes the actual trajectory instance that the aircraft will fly, subject to later changes (if any) from a subsequent iterative update of the projected trajectory. As illustrated the projected trajectory is precomputed to clear any terrain threat, such as at 68. Thus when triggered by the first occurring threat at 66 (which could be for example, a speed violation due to a nose-low condition) the recipe used to compute the shape of the projected trajectory is designed to avoid the terrain threat at 68.

Piecewise Recovery

As discussed above, the projected trajectories are all iteratively computed in advance of actually being needed. The recovery system is designed to take action only after all projected trajectories but one have been deprecated, with the last remaining projected trajectory being triggered for use only when the aircraft comes within the margin limit of a threat.

Figure 7:
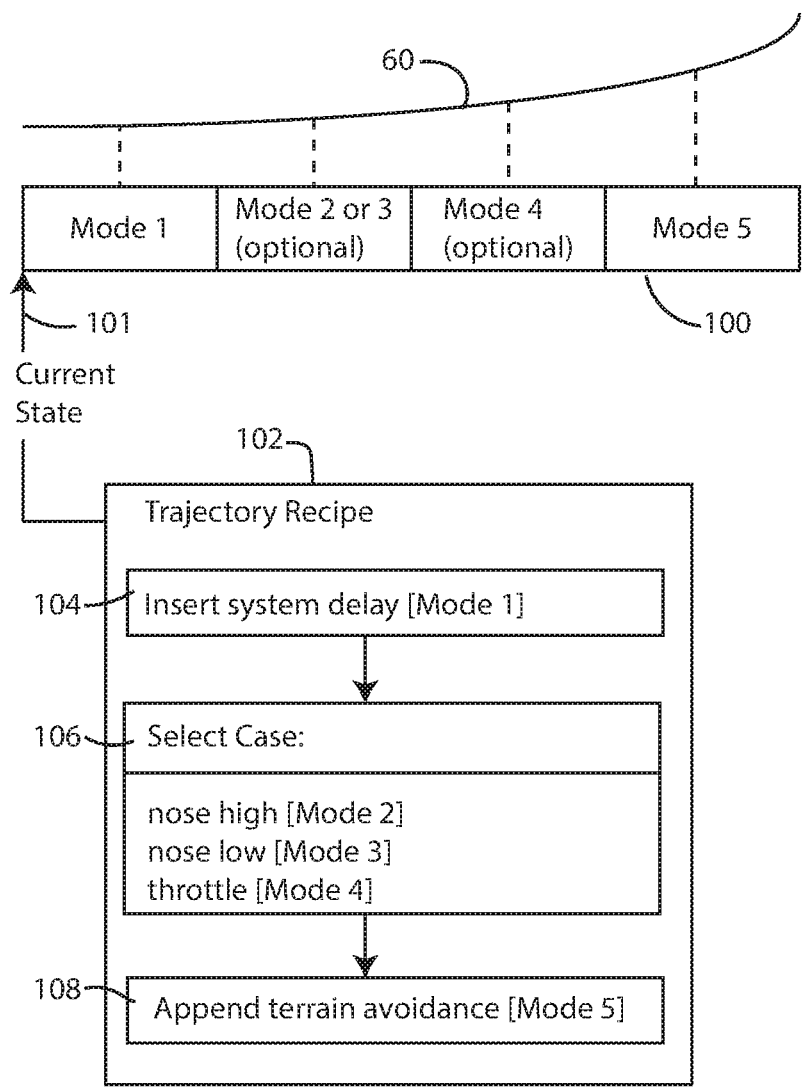
FIG. 7 is a flowchart and piecewise segment data model diagram illustrating how a piecewise trajectory may be computed.

In one embodiment, the actual shape of each projected trajectory may be stitched together in a piecewise fashion, using a trajectory recipe executed by the processor as illustrated in FIG. 7. Specifically, the processor generates trajectory 60 by stitching together or concatenating a sequence of segments, shown diagrammatically at 100, where each segment is selected to achieve a different predetermined hazard avoidance maneuver. Each trajectory generated is computed according to the trajectory recipe 102 based on the aircraft's current state 101. For convenience, these different hazard avoidance maneuvers may be classified into modes. In the illustrated implementation five modes are depicted, each having the following different purposes or functions:

Mode 1—a delay mode or coasting mode that models or predicts where the aircraft will be by the time all of the trajectories have been computed, deprecated if required, and assessed to determine if a triggering event has occurred. In an exemplary system, the system computation time required to perform these tasks may be only a fraction of a second, and yet this fraction of a second needs to be accounted for. During this computation time the aircraft is flying on whatever its current trajectory happens to be. Thus the Mode 1 calculation determines where the aircraft will be after these system computations have been completed (e.g., where the aircraft will be some fraction of a second after the processor began the current trajectory generating iteration. Recipe 102 always begins by inserting a Mode 1 segment at the head of the segment sequence 100, as indicated by step 104 of the trajectory recipe 102.

Mode 5—a terrain avoidance mode that models or predicts an endgame solution that will avoid a terrain collision. Like the Mode 1 segment, the processor will always append a Mode 5 segment to the end of the segment sequence 100, as indicated by step 108 of the trajectory recipe 102. There is sound reason for this. When the last remaining trajectory is triggered by a hazard event (which could be a hazard itself unrelated to a terrain collision) the autopilot executing the triggered trajectory needs to have a terrain avoidance solution queued up to avoid a terrain hazard should one also exist. Thus all piecewise sequences end with a Mode 5 avoidance maneuver. The reason for ending the trajectory with a Mode 5 maneuver is that the avoidance maneuver must continue until the hazard is avoided and a safe status quo exists regarding a particular threat. Thus even after energy threats are avoided, the trajectory must be extended some additional time to ensure that all the physical threats are avoided too.

Modes 2, 3 and 4—are optional sequence segments that the processor will insert between the Mode 1 and Mode 5 segments, as illustrated in FIG. 7, based on a decision tree analysis of the aircraft's current state. In general, Modes 2 and 3 model aircraft states in which a flight angle violation (nose high, nose low) is potentially applicable, while Mode 4 models the aircraft state in which the throttle may require a setting change. The processor selects one or more of these intermediate modes and inserts them into the segment sequence 100 based on the current state of the aircraft, as at step 106.

In some instances the decision tree executed by the processor logic will select only a singular intermediate segment, such as a singular Mode 2, Mode 3, or Mode 4 segment. In other cases the recipe may call for a more complex solution where these intermediate modes are concatenated together. For example, a recipe might call for a Mode 2 recovery from a nose high condition, which in turn produces a potential future speed violation that is compensated for by a follow-on Mode 4 segment. In this regard, while the overall predicted trajectory is iteratively computed relative to the current state of the aircraft as discussed above, the decision tree logic used by the processor in stitching together the required mode segments for the current iterative solution does not always use only aircraft state information captured when the iteration began. The processor also uses future predicted state of the aircraft (as it is in process of executing the computed trajectory). Some decision tree branches require this. For example, if the aircraft is executing a recovery from a very steep bank angle or from an inverted state, the nose may not be low at the outset of the recovery maneuver, but given the dynamics of the aircraft in flight, it will be in a nose low state very soon (as a result of the current mode segment maneuver).

Figure 4:
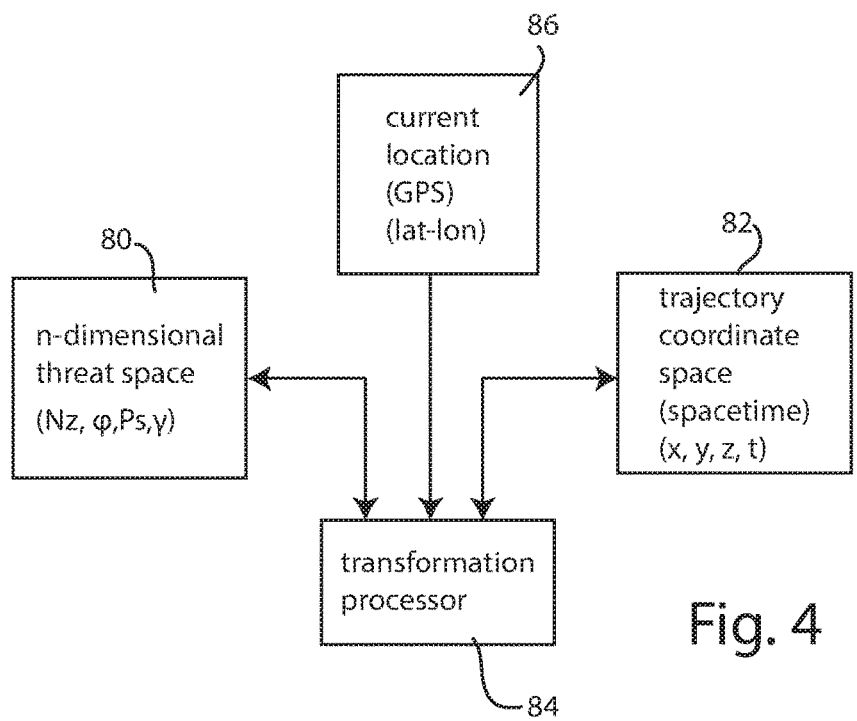
FIG. 4 is a data model block diagram showing the relationship between the n-dimensional threat space and the trajectory coordinate space (spacetime)

The piecewise recovery modes may be expressed in terms of the common schema of the n-dimensional threat space 80 (FIG. 4). For example, the nose high recovery [Mode 2] uses Nz, bank φ and Ps to restore aircraft attitude. The nose low recovery [Mode 3] uses Nz, idle and elimination of bank φ to restore aircraft attitude. A direct climb uses max power and pitch to capture and/or hold climb speed. Within these basic recovery recipes, the processor is also able to control the aggressiveness degree to which the predicted trajectories are formulated. For example, to ensure a smooth, passenger safe recovery (comfort recovery), the processor might use, for example, the following properties:

0.8-1.2 g
0.1 g/sec onset
6 degree/sec roll rate
5 degree/sec/sec onset
5 sec speedbrake retract
~20 sec power advance The foregoing are merely intended as examples of parameters that achieve a featherbed ride quality. Other parameters may be used, depending on the type of aircraft. Of course, in certain situations where a hard recovery is dictated, one or more of these featherbed ride properties would be dispensed with and more aggressive properties used.

Kinematic-Energy Model

The presently preferred, minimal set of fundamental variables used by processor 10 relies upon a kinematic-energy model that defines a predictive trajectory in terms of the aircraft's physical position, its energy state, and the forces acting on the aircraft that affect trajectory. In this regard forces normal to the aircraft's longitudinal axis (normal forces) change the trajectory direction, while forces tangential to the aircraft's longitudinal axis (tangential forces) change the aircraft's velocity along that trajectory.

Figure 2:
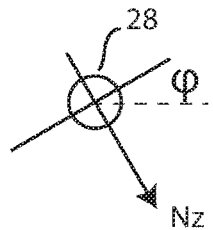
FIG. 2 is a schematic representation of an aircraft, useful in understanding certain force vectors and angles used by the disclosed common schema and kinematic-energy models.

In one embodiment the common schema for the n-dimensional threat space can be represented by a minimal set of fundamental variables, $N_z$, φ, $P_s$ and γ. As shown in FIG. 2, $N_z$ represents the normal force (force acting normal or perpendicular to the longitudinal axis of the aircraft). In FIG. 2, the longitudinal axis of the aircraft 28 is directed into the page. This normal force $N_z$ also represents the g-force acting on the aircraft. When the aircraft is flying in a level, steady state condition, the g-force acting on the aircraft is the force of gravity. However, when the aircraft is flying with a non-zero bank angle φ the g-force orientation is changed.

Figure 3:
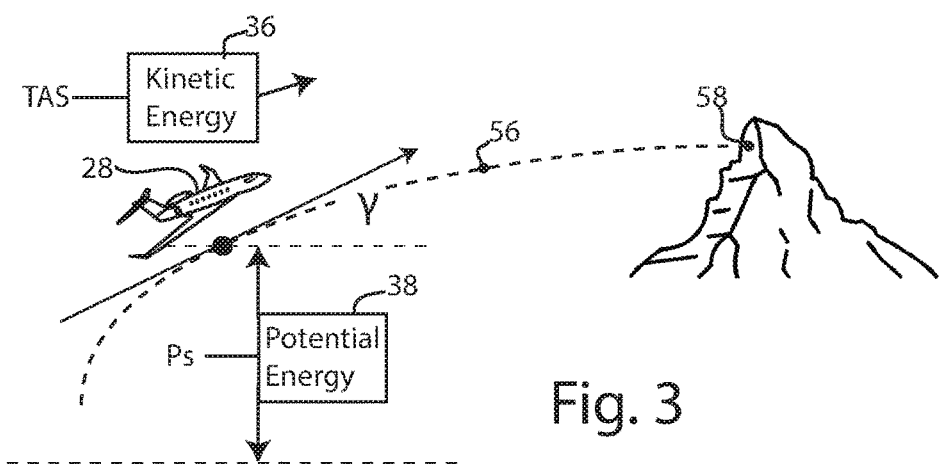
FIG. 3 is a schematic representation of an aircraft, useful in understanding certain energy values used by the common schema and kinematic-energy models, and also showing a projected trajectory with exemplary energy and matter threats.

Illustrated in FIG. 3, the energy state of the aircraft 28 comprise two components: kinetic energy 36, related to the velocity of the aircraft ($KE=\frac{1}{2} mv^2$ where m is aircraft mass and v is velocity), and potential energy 38, the energy available to produce acceleration. The potential energy includes an aircraft altitude component—potential energy increases with altitude ($PE=mgh$ where m is aircraft mass, h is aircraft altitude and g is the gravitational constant)—and a portable stored energy component representing the amount of additional thrust that can be developed by increasing the power output of the engines. While there are many measurable variables that can be used to calculate the kinetic and potential energy of the aircraft, in one embodiment the kinetic energy 36 is derived from the true air speed (TAS); the potential energy 38 is derived from the aircraft altitude, specific excess power $P_s$ (available thrust power minus drag power) and the flight path angle γ. The specific excess power $P_s$ is normalized to be independent of the aircraft weight, making $P_s$ a weight-independent energy term. A value $P_s=0$ signifies that there is no excess power available, meaning every bit of power is simply overcoming the drag. In the $P_s=0$ condition, the aircraft can still accelerate by flying nose down, or can still decelerate by flying nose up. This effect is accounted for by the γ term, which represents the flight path angle (nose-up, nose-down angle). When a non-zero γ angle is invoked, kinetic energy and potential energy are exchanged: a nose-up γ angle gives up some kinetic energy to increase potential energy; conversely, a nose-down γ angle gives up some potential energy to increase kinetic energy.

These variables may be used both to represent threats within the n-dimensional threat space 80, shown in FIG. 4 and may also be used to calculate the aircraft's position and energy state at future positions in spacetime along a projected trajectory by using kinematic-energy relationships to transform data between the n-dimensional threat space 80 and the trajectory coordinate space 82. The kinematic-energy relationship transformations are performed by the transformational processor 84, which may be implemented by programming processor 10 with the kinematic-energy relationships that relate aircraft $P_s$, $N_z$, $\phi$, and $\gamma$ threat space values to the aircraft trajectory coordinates in spacetime (x, y, z, t).

The disclosed predictive aircraft threat envelope protection system is able to provide full envelope protection because of its unique data model that can represent all threats using a common schema employing a minimal set of fundamental variables. As illustrated in FIG. 4 the disclosed threat envelope protection system, in essence employs a kinematic-energy data model based on a minimal set of variables and processor component that ties key components of the data model together. One key component of the data model defines the n-dimensional threat space 80 by which all threats are representing using a pair of force variables ($Nz$, $\phi$) and a pair of energy state variables ($Ps$, $\gamma$). The threats to be protected against that are known a priori are pre-populated into the threat envelope data structure 22 (FIG. 1). Threats known a priori would include, for example threats relating to different energy limits, such as stall limits, overspeed limits and under-speed limits. Some of these limits are known at the aircraft design time, while other limits are calculated during flight.

Another key component of the data model defines the trajectory coordinate space in terms of spacetime variables (x, y, z, t). Some threats, such as terrain objects and other aircraft (both examples of physical matter that occupy space) in the vicinity are more readily represented in coordinate space, based on the object's position. For example the system may utilize map data to store the physical location of terrain structures such as mountains that may be encountered during flight. The system is able to model both energy threats and matter threats. To illustrate, in FIG. 4 two threats lie on the aircraft trajectory, an energy threat 56 (which could be, for example, an aircraft stall limit) and a matter threat 58 (which could be a terrain object, such as a mountain).

To tie these two data model components together, processor 10 (FIG. 1) is programmed with the necessary kinematic equations to function as a transformation processor 84 that uses the current aircraft location 86, obtained from suitable sensor such as GPS, and the force variables and energy state variables within threat space 80, to calculate the projected trajectories in trajectory coordinate space 82. If needed, the transformation processor can also project points in trajectory coordinate space 82 into threat space 80, to assess for example whether the current or projected future location of the aircraft intersects with envelope threat limits.

Full-Envelope Protection

Full envelope protection provided by the disclosed aircraft flight envelope protection system involves two related aspects: (1) the protection afforded by the disclosed system covers all circumstances, not just the most common hazards; and (2) the disclosed system handles plural different threat conditions concurrently. It is not limited to a singular threat. To illustrate the first aspect, the system is designed to provide protection in all circumstances not just in the heart of the flight envelope or for the most common hazards. For example, a conventional overspeed protection system only works while near wings level. At very high bank angles, the overspeed protection is suppressed. The reason for this is logical. The overspeed protection works by pulling the nose up to help slow the aircraft. If the aircraft was at a very high bank angle, inverted for example, pulling the nose up can exasperate the problem instead of alleviating it. The full envelope protection afforded by the disclosed system does not have such limitations and works across the entire spectrum of aircraft flight conditions.

To illustrate the second aspect, the system is designed to provide full protection against all threats not just a single threat. In a conventional enhanced ground proximity warning system (TAWS), for example, protection is provided against ground impact. However low speed protection is not provided—a separate low-speed protection system is conventionally provided for that. In contrast, the disclosed aircraft flight envelope protection system provides protection against all threats in a single system. Handling all threats in a single system avoids conflicts that can arise with a collection of federated systems.

To illustrate, there have been mishaps involving aircraft equipped with TAWS and low speed protection that have hit the ground at slow speed. The problem is that federated systems are not cognizant of other systems assumptions. In the example case, the aircraft was flying at a slow speed, but the low speed protection was not triggered because the speed was not close to stall, although the speed was slow enough to prevent an immediate climb. The ground proximity system was not triggered because the aircraft was on descent to a runway and the system assumed that climb capability existed. Neither system was aware of the other system's proximity to a threat and the assumptions that the other systems made regarding speed and altitude. The disclosed aircraft flight envelope protection system provides a seamless comprehensive system that provides protection against all threats with full awareness of all relevant parameters.

Predictive Envelope Protection

Traditional envelope protection systems use rules of thumb, based on assumptions, to determine when an alert must be generated to alert the crew of an impending envelope excursion. For cases close to the assumed design case, these systems can work reasonably well. However, for cases markedly different from the design point, the system performance degrades or fails completely. Consider again the conventional TAWS, which uses rules of thumb exclusively.

Figure 6A:
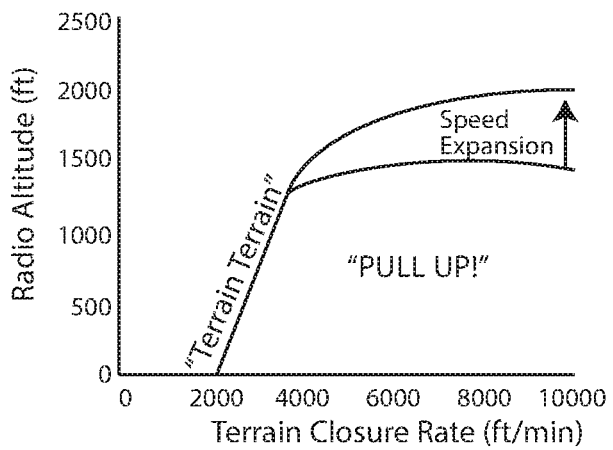
FIG. 6A is a graph of aircraft altitude vs terrain closure rate, illustrating regions where different pilot alert messages are commonly generated in prior art systems.
Figure 6B:
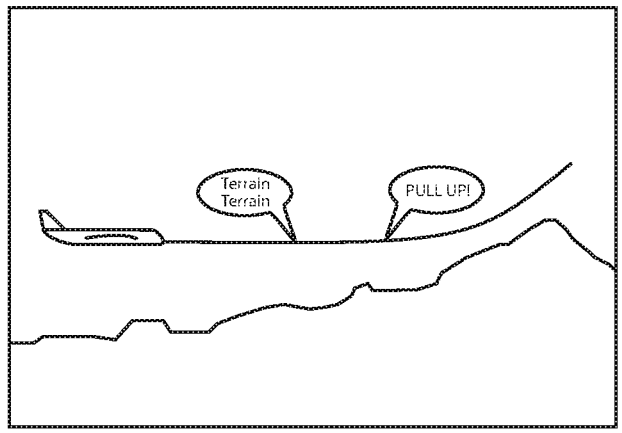
FIG. 6B is a diagram of an aircraft flying above terrain, illustrating where prior art systems will typically issue different pilot alert messages, in the desired case where assumptions about terrain slope are reliable.

An exemplary conventional TAWS system is illustrated in FIG. 6A. This conventional TAWS uses radio altimeter altitude and rate of change to determine timing of the pull-up alert. Under nominal conditions, illustrated in FIG. 6B, the alert will sound at a point that is not so early as to be a nuisance, but early enough for the pilot to react and initiate a climb that will clear the rising terrain. The accuracy of this method is dependent on two factors.

Figure 6C:
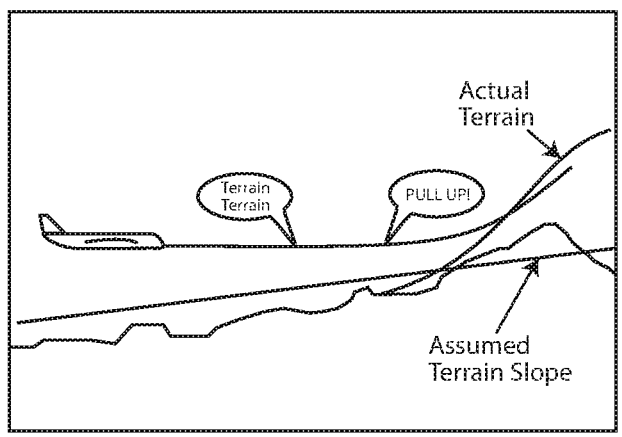
FIG. 6C is a diagram of an aircraft initially flying above terrain, illustrating where prior art systems will typically issue different pilot alert messages, in the undesired case where assumptions about terrain slope do not comport with the actual terrain, such that terrain collision is not avoided by the prior art system.

First, the terrain in front of the aircraft must match reasonably well with the terrain currently being measured. The system looks at current terrain clearance and rate of change of that terrain; but if the terrain slope changes, clearance may not be assured. FIG. 6C illustrates what would happen if the terrain slope varied markedly from current slope. FIG. 6C shows that if the terrain slope increases in front of the aircraft, terrain clearance may not be assured.

Second, the accuracy of this type of conventional system depends on the ability of the aircraft in its current configuration being able to fly the expected profile. Looking again at FIGS. 6A-6C, the illustrated aircraft trajectory is assumed to be able to pull up above the rising terrain. This is an assumption that may or may not be accurate. The conventional TAWS system does not consider high altitude terrain where climb performance is significantly less than at sea level. It does not consider gross weight effects or engine failure conditions. The nominal case may not extend to the entire envelope. In contrast, the disclosed predictive system does not rely on precomputed rules of thumb, but instead looks at the current conditions to predict climb performance. In the disclosed predictive system, the actual terrain in front of the aircraft is used and the actual climb capability is used. In order to accomplish this, the significant factors affecting the climb capability of the aircraft are considered in real time and the actual terrain profile is compared to the current climb capability to determine an accurate warning initiation. While all factors affecting climb capability could be considered, in a practical embodiment it is usually only necessary to consider enough factors to ensure an adequate level of fidelity; insignificant factors having little impact can be excluded.

Kinematic Energy-Methods Modeling

As discussed above, the disclosed predictive aircraft flight envelope protection system uses kinematic modeling that focuses concern only with what happens and not why it happens. The disclosed system computes the relevant predictive trajectory from the physical position of the aircraft and its energy state. The disclosed system is not concerned with the forces or moments that cause that motion but only what the motion is. As a result, parameters such as elevator effectiveness, static longitudinal stability, short period frequency and damping ratio and many other parameters are of no significance. To predict a future trajectory, the disclosed predictive system only needs to concern itself with the forces that affect that trajectory.

In this regard, normal forces change trajectory direction and tangential forces change velocity along that trajectory. With that in mind, the disclosed system models a 3-D trajectory very well by looking only at $P_s$, $N_z$, $\phi$, and $\gamma$. Vertical trajectory is dependent only on the vertical component of $N_z$ which can be modeled easily using the aircraft's current configuration and flight conditions. Simplified modeling using an $N_z$ onset rate and a steady state $N_z$ is more than sufficient to accurately model the trajectory. Horizontal trajectory is dependent only on the horizontal component of $N_z$. Bank angle determines the distribution of $N_z$ into vertical and horizontal components and roll can be modeled adequately using a roll onset rate and a steady state roll rate derived from current aircraft configuration and flight conditions.

The velocity change that occurs along the trajectory is dependent only on the vertical component of the trajectory and the $P_s$ of the aircraft at the time. $P_s$ is specific excess power and it tells the system how much excess power an aircraft has that can be used to climb or to accelerate. If the aircraft is in level flight and Ps is equal to zero, the aircraft will maintain current velocity. If $P_s$ is +100 ft/sec, it will accelerate in level flight. If it is +100 ft/sec but the aircraft is in a climb at 100 ft/sec, the aircraft will climb while holding constant airspeed. By using the current climb and the climb capability expressed in feet per second, the future velocity state of the aircraft can be accurately predicted. FIG. 3 illustrates a single iterative step in the modeling routine that uses kinematic modeling and energy-methods.

Rapid Computation Modeling

The predictive method described above can be computationally intensive to perform real time so some techniques developed for the disclosed embodiment can be helpful. First, accurate predictions of future airspeed are necessary to perform airspeed envelop protection. Computing calibrated airspeed (CAS) and Mach from the modeled true airspeed (TAS) can be computationally intensive. Computing accurate $P_s$ can also be quite intensive. One technique to address these computational issues is to use a table lookup function. Another method is to perform a linear or second order curve fit of $P_s$ as a function of altitude for the nominal case (250 KCAS, Mid weight, STD . . . ) and then adjust that for off-nominal conditions using $P_s$ debits. Such debits include, a debit for airspeed (as a function of altitude), a debit for Speed brakes, a debit for Single Engine, a debit for no standard day temp, etc. These can be added/subtracted from the computed debit. Many of the parameters can be computed only once during the modeling. For example, the latitudinal and longitudinal wind drift for each iteration of the model can be precomputed and used for each iteration that follows as the wind drift will be the same.

Multi-Trajectory

The disclosed predictive system is a multi-trajectory system that in one preferred embodiment uses 3 primary trajectories to predict a warning/recovery initiation time. Another embodiment, capable of recovery from aircraft inverted (upside-down) conditions, uses 6 primary trajectories. Before discussing multiple trajectories, first consider a single predictive trajectory system and how that would be implemented into a warning system. For a single predictive trajectory system, the system would look at current state and then assume a recovery would be initiated at that moment. The predictive recovery would then be modeled and tested for proximity to protected threats. For example, if the aircraft were in a dive toward the ground, the system would predict what the nose low recovery would look like and test that trajectory for proximity to both airspeed limits and terrain. If no limits were exceeded and the margins were acceptable, no warning would be issued. If limits were exceeded or margins unacceptably small, a recovery warning would be triggered "PULL-UP" for example. In many cases, a single trajectory is sufficient. In the nose low case against flat terrain, there is really only one good way to recovery and that is to roll wings level, reduce power and pull to recovery Nz until clear of the terrain and airspeed limits.

The reason for supporting plural predictive trajectories (e.g., 6 trajectories in one preferred embodiment) can be illustrated by a second example in which the aircraft is flying level toward a single butte in the desert. In such a case, there are two predictive trajectories that might be used. The pilot could avoid the butte by turning left or right to avoid it, or by staying on course and climbing above it. This raises the question, at what point should the system initiate a "PULL UP" warning? Perhaps not at all if a level turn is best. The solution to this problem is to use multiple trajectories. Since the pilot has multiple escape options, the system models each of those options. In the butte example, the system would model three trajectories, a left turning trajectory, a right turning trajectory, and a climbing trajectory. If a single trajectory violates a limit or has insufficient margins but the others are clear, no warning is issued as the pilot still has margin for another option. A warning is only issued when there is only one viable trajectory and that trajectory reaches a trigger point. So in the butte example, if the left and right turn are ruled out, a "PULL UP" will be issued when the climbing trajectory margins fall below a desired threshold. If due to a different approach or type of terrain, the climbing trajectory is ruled out, a "TURN LEFT" or "TURN RIGHT" warning will be issued when the respective trajectory is the last available and has reached its trigger margin.

Once again, because pilots have multiple escape options, a 100% nuisance free system that provides 100% protection MUST contemplate (and model) all possible escape options.

In a practical embodiment a system would not typically model all options—representative examples of each different type of trajectory solution is usually sufficient. For example, in the butte case, it was possible to do a climbing right turn at 10 degrees bank, a climbing right turn at 15 deg bank etc. Each trajectory can be adjusted a tiny amount creating an infinite number of possible trajectories. However, the 30 degree and 29 degree bank trajectories are functionally indistinguishable. Therefore, it is only necessary to model the entire range of recoveries with enough graduation to prevent nuisance warnings. We have determined that for business jets very good results are obtained using a minimum of three trajectories for terrain avoidance and a single trajectory for speed limits. Exemplary trajectories for one embodiment include a level climb, and 30 degree bank left and right climbing turns. Seven (7) trajectory and infinite trajectory systems may also be employed. These greater numbers of trajectories may have utility in military systems, for example, that require nape of the earth nuisance free operation.

While three (3) primary trajectories represent a minimal set, a better implementation is based on six primary trajectories. The reason for this is that we cannot assume that each of the three trajectories mentioned above can be initiated immediately. A level climb, for example, may need to be preceded by a nose high recovery to attain climb speed before initiating the steady climb. Here the three final climbs are referred to as the final climb or the direct climb. For some systems, the aircraft is always in a position to go directly into the final steady state climb. In business jets, the final climb will likely be preceded by a zoom to trade excess airspeed into altitude while capturing the optimum steady state climb. In some cases a nose low recovery must be initiated first where power is left back to keep airspeed under control before reaching an attitude where power can be brought to full for the final climb. Because the aircraft can perform nose high recoveries in two directions and nose low recoveries in two directions (rolling in shortest direction to level or rolling through the vertical to level) there are six total trajectories.

Above, the six trajectories are designated as primary trajectories. If desired, an embodiment may also support additional trajectories to accomplish other purposes. For example, once the preferred trajectory is found, it can be run again using a two-second pilot delay to help determine a more precise warning initiation. Also, if desired, the preferred trajectory may be computed again using a more aggressive recovery model. This more aggressive recovery model is then blended with the originally calculated preferred trajectory, to help blend between soft ride and hard ride recovery options.

Automatic

The predictive aircraft flight envelope protection system is a fully automatic system, which means that it does not rely on pilot intervention. While it can provide and probably should provide a warning to the pilot, the system is automatic and not dependent on the pilot heading that warning to provide protection. This requires a few additional considerations. First, we need a system to give effect to the predictive warning. An auto-pilot of some form needs to be implemented that executes an envelope protecting maneuver. That auto-pilot should have full authority over roll and pitch as well as speedbrake and throttle. Further, since the system must operate in one-engine-inoperative (OEI) cases, the auto-pilot must be able to handle asymmetric thrust conditions. The solution provided by the disclosed system is to add thrust compensation into the basic aircraft control laws. As a result, even when an avoidance is not in progress, the aircraft behaves as if the thrust lines of both engines were along the centerline of the aircraft. In a one embodiment, the N1 difference between engines is used to schedule compensating rudder. There are other recognized methods of thrust compensation that can be used as an alternative to N1.

A second necessary feature of an automatic system is that it must be much more resistant to failures and corrupted sensors than a manual system. With a manual system, the false warning can be easily ignored. With an automatic system, it cannot be ignored and therefore the resistance to false warnings must be significantly higher. The disclosed system thus provides multiple-redundant sensors combined with monitor circuits that determine when a sensor has failed or is suspect, and voter circuits that determine what sensor value is reported to the system when there is some variation between the multiple-redundant sensors.

Finally, the automatic system allows pilot input to be blended with the control provided by the system. In previous systems of this nature (e.g., legacy automatic ground collision avoidance systems used in military applications), the recovery is typically always nearly the maximum capability of the aircraft. The reasons for this derive from performance required for military applications, where nuisance free extreme low level operation (nape of the earth operation) was required without regard to ride quality. In a business jet, the opposite is true. Extreme low level, nape of the earth operations are not required and ride quality for passengers is of paramount importance. As a result, the preferred recovery for a business jet is typically nowhere near the maximum performance capability of the aircraft.

The smooth, passenger safe recovery does create challenges, however. First, during upsets when a jet wake flips an aircraft upside down or a wind shear throws the aircraft toward the ground, a smooth, passenger safe recovery will not suffice. In these extremely rare "Act of God" cases, it is irrelevant how the aircraft got there; it is paramount to recover the aircraft, using all available control power. Second, there are instances where an automatic recovery initiates but during the recovery, the pilot becomes aware of how close to the ground he really is and wishes to increase the terrain margin by increasing performance of the recovery. In this case, the system will permit the pilot to increase recovery aggressiveness by blending pilot input with the calculated smooth, passenger safe recovery. Thus the system flexibly handles the extremes where the smooth, passenger safe recovery may not be appropriate: in one case allowing the system to automatically increase recovery aggressiveness, and in another case allowing the pilot to do so. To address these cases, the system implements a non-binary control system that will be described next.

Non-Binary

In a binary system, the auto-recovery or warning is either on or off, there are no middle states. As mentioned previously, the disclosed automatic system designed for business jet requires more. The solution is a non-binary system. In the disclosed system, the smooth, passenger safe soft ride is used but pilot blending is allowed and the soft ride will automatically blend into a harder and harder recovery if the margins degrade or fail to improve. One way to accomplish this is by comparing the soft ride preferred trajectory to the hard ride trajectory in the same direction and blending a nudger/fader based on that comparison. Other methods can be used where the margins to the limits can be used to drive the blending. For example, the processor can assess if a smooth ride fails to achieve the margins desired. In such case the trajectory predicting algorithm incrementally increases aggressiveness and directs an increasingly more aggressive recovery in response. The nudger/fader design should be built such that pilots can aid the recovery but are progressively prevented from degrading the recovery when margins are small.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment as contemplated herein. It should be understood that various changes may be made in the function and arrangement of elements described in an exemplary embodiment without departing from the scope of the invention as set forth in the appended claims.

What is claimed is:

1. A method of precomputing a projected recovery trajectory for an aircraft autopilot system, comprising:
   providing a stored set of predefined recovery mode segments, including:
      a mode 1 segment that models an aircraft coasting;
      a mode 2 segment that models the aircraft executing a nose high recovery;
      a mode 3 segment that models the aircraft executing a nose low recovery;
      a mode 4 segment that models the aircraft executing a throttle only recovery;
      a mode 5 segment that models the aircraft executing a terrain avoidance recovery;
   using a processor to generate at least one projected recovery trajectory based on a current in-flight state of the aircraft and a predicted future state of the aircraft as it executes a recovery, where the processor concatenates selected ones of the predefined recovery mode segments into a sequence and uses that sequence to generate a projected trajectory, such that the progress of one recovery mode segment determines which subsequent recovery mode segment will follow, if any.

2. The method of claim 1 wherein the processor selects the mode 1 segment as a first segment in the sequence to generate the projected trajectory.

3. The method of claim 1 wherein the processor selects the mode 5 segment as a last segment in the sequence to generate the projected trajectory.

4. The method of claim 1 wherein the processor selectively concatenates one or more of modes 2, 3 and 4 and places them between the mode 1 segment and the mode 5 segment.

5. The method of claim 1 wherein the processor selectively concatenates one or more of modes 2 and 3 and places them between the mode 1 segment and the mode 5 segment.

6. The method of claim 1 wherein the processor selectively concatenates one or more of modes 2 and 4 and places them between the mode 1 segment and the mode 5 segment.

7. The method of claim 1 wherein the processor iteratively generates a plurality of projected trajectories each having a plurality of sequences.

8. The method of claim 1 wherein the processor iteratively generates a plurality of sequences, each sequence being calculated relative to a different predicted future state of the aircraft during an execution of a recovery sequence.

9. The method of claim 1 wherein a plurality of the predefined recovery mode segments are based on plural different types of hazards each modeled using common schema.

10. An apparatus for precomputing a projected recovery trajectory for an aircraft autopilot system, comprising:
    a computer-readable medium configured to store a set of predefined recovery mode segments, including:
       a mode 1 segment that models an aircraft coasting;
       a mode 2 segment that models the aircraft executing a node high recovery;
       a mode 3 segment that models the aircraft executing a nose low recovery;
       a mode 4 segment that models the aircraft executing a throttle only recovery;
       a mode 5 segment that models the aircraft executing a terrain avoidance trajectory;
    a processor programmed to generate at least one projected recovery trajectory based on a current in-flight state of the aircraft, and a predicted future state of the aircraft as it executes a recovery, where the processor is programmed to access said computer-readable medium and to concatenate selected one of the predefined recovery mode segments into a sequence and uses that sequence to generate a projected trajectory, such that the progress of one recovery mode segment determines which subsequent recovery mode segment will follow, if any.

11. The apparatus of claim 10 wherein the processor is programmed to select the mode 1 segment as a first segment in the sequence to generate the projected trajectory.

12. The apparatus of claim 10 wherein the processor is programmed to select the mode 5 segment as a last segment in the sequence to generate the projected trajectory.

13. The apparatus of claim 10 wherein the processor is programmed to selectively concatenate one or more of modes 2, 3 and 4 and places them between the mode 1 segment and the mode 5 segment.

14. The apparatus of claim 10 wherein the processor is programmed to selectively concatenate one or more of modes 2 and 3 and places them between the mode 1 segment and the mode 5 segment.

15. The apparatus of claim 10 wherein the processor is programmed to selectively concatenate one or more of modes 2 and 4 and places them between the mode 1 segment and the mode 5 segment.

16. The apparatus of claim 10 wherein the processor iteratively generates a plurality of sequences used to generate a plurality of projected trajectories.

17. The apparatus of claim 10 wherein the processor iteratively generates a plurality of sequences each sequence being calculated relative to a different predicted future state of the aircraft during an execution of a recovery sequence.

18. The apparatus of claim 10 wherein a plurality of the predefined recovery mode segments are based on plural different types of hazards each modeled using common schema.

19. A method of precomputing a projected recovery trajectory for an aircraft autopilot system, comprising:
    providing a stored set of predefined recovery mode segments; and
    using a processor to generate at least one projected recovery trajectory based on a current in-flight state of an aircraft and a predicted future state of the aircraft as it executes a recovery, where the processor concatenates selected ones of the predefined recovery mode segments into a sequence and uses that sequence to generate the projected trajectory, such that the progress of one recovery mode segment determines which subsequent recovery mode segment will follow, if any.

20. An apparatus for precomputing a projected recovery trajectory for an aircraft autopilot system, comprising:
- a computer-readable medium configured to store a set of predefined recovery mode segments; and
- a processor programmed to generate at least one projected recovery trajectory based on a current in-flight state of an aircraft and a predicted future state of the aircraft as it executes a recovery, where the processor concatenates selected ones of the predefined recovery mode segments into a sequence and uses that sequence to generate a projected trajectory, such that the progress of one recovery mode segment determines which subsequent recovery mode segment will follow, if any.

* * * * *